(12) United States Patent
Watahiki et al.

(10) Patent No.: US 8,955,312 B2
(45) Date of Patent: Feb. 17, 2015

(54) REDUCTANT AQUEOUS SOLUTION MIXING DEVICE AND EXHAUST AFTERTREATMENT DEVICE PROVIDED WITH THE SAME

(71) Applicants: Tatsuya Watahiki, Oyama (JP); Hidehiko Kobayashi, Oyama (JP); Hiroyuki Chino, Oyama (JP)

(72) Inventors: Tatsuya Watahiki, Oyama (JP); Hidehiko Kobayashi, Oyama (JP); Hiroyuki Chino, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/000,567

(22) PCT Filed: Jan. 17, 2013

(86) PCT No.: PCT/JP2013/050763
§ 371 (c)(1),
(2) Date: Aug. 20, 2013

(65) Prior Publication Data
US 2014/0196444 A1 Jul. 17, 2014

(51) Int. Cl.
*F01N 3/00* (2006.01)
*F01N 1/00* (2006.01)
(Continued)

(52) U.S. Cl.
CPC ..................... *F01N 3/035* (2013.01)
USPC ............... 60/295; 60/286; 60/320; 60/324; 60/297; 422/169

(58) Field of Classification Search
CPC ........................ F01N 10/1453; F01N 3/2066
USPC ..................... 60/286, 295, 320, 324
See application file for complete search history.

(56) References Cited

U.S. PATENT DOCUMENTS

| | | |
|---|---|---|
| 5,284,016 A | 2/1994 | Stark et al. |
| 7,157,060 B1 | 1/2007 | Newburry |

(Continued)

FOREIGN PATENT DOCUMENTS

| | | |
|---|---|---|
| CN | 101815851 A | 8/2010 |
| DE | 102007055874 A1 | 6/2008 |

(Continued)

OTHER PUBLICATIONS

U.S. Appl. No. 13/696,282, filed Nov. 5, 2012, Title: "Reducing Agent Aqueous Solution Mixing Device and Exhaust Gas Post-Treatment Device", First Named Inventor: Tadashi Iijima.
(Continued)

*Primary Examiner* — Thomas Denion
*Assistant Examiner* — Anthony Ayala Delgado
(74) *Attorney, Agent, or Firm* — Holtz Holtz Goodman & Chick PC

(57) ABSTRACT

A mixing device of an exhaust aftertreatment device includes: an elbow pipe attached to an outlet pipe of a filter device; a straight pipe connected to a downstream side of the elbow pipe to extend in a direction intersecting an axial line of the outlet pipe; and an injector attached to the elbow pipe, the injector injecting a reductant aqueous solution into inside the elbow pipe toward the straight pipe. The elbow pipe includes: an inlet connected with the outlet pipe; an outlet connected with the straight pipe; a direction-changing section provided between the inlet and the outlet; and an injector attachment provided outside the direction-changing section and attached with the injector. The injector attachment is offset toward the outlet. The direction-changing section includes a first bulging portion provided by bulging outward a portion thereof opposite to the injector attachment.

8 Claims, 8 Drawing Sheets

(51) Int. Cl.
  *F01N 3/02* (2006.01)
  *F01N 5/02* (2006.01)
  *B01D 50/00* (2006.01)
  *F01N 3/035* (2006.01)

(56) References Cited

U.S. PATENT DOCUMENTS

| | | |
|---|---|---|
| 7,919,052 B2 | 4/2011 | Ahmed |
| 8,302,306 B2 | 11/2012 | Hill et al. |
| D702,736 S | 4/2014 | Tomioka et al. |
| 8,696,777 B1 | 4/2014 | Patil et al. |
| D704,227 S | 5/2014 | Chino et al. |
| D707,258 S | 6/2014 | Tomioka et al. |
| 2003/0079467 A1 | 5/2003 | Liu et al. |
| 2003/0110763 A1 | 6/2003 | Pawson et al. |
| 2006/0191254 A1 | 8/2006 | Bui et al. |
| 2007/0001405 A1 | 1/2007 | Watanabe et al. |
| 2007/0110642 A1 | 5/2007 | Hirata |
| 2007/0193252 A1 | 8/2007 | McKinley et al. |
| 2008/0092526 A1 | 4/2008 | Kunkel et al. |
| 2008/0155973 A1 | 7/2008 | Maruyama et al. |
| 2008/0216470 A1 | 9/2008 | Sedlacek et al. |
| 2008/0229733 A1 | 9/2008 | Newburry et al. |
| 2009/0000282 A1 | 1/2009 | Gruber |
| 2009/0158722 A1 | 6/2009 | Kojima et al. |
| 2009/0313979 A1 | 12/2009 | Kowada |
| 2010/0058745 A1 | 3/2010 | Kim |
| 2010/0107612 A1 | 5/2010 | Yamazaki et al. |
| 2010/0146950 A1 | 6/2010 | Hayashi et al. |
| 2010/0178216 A1 | 7/2010 | Honda et al. |
| 2010/0186393 A1 | 7/2010 | Kowada |
| 2010/0212292 A1 | 8/2010 | Rusch et al. |
| 2010/0212301 A1 | 8/2010 | De Rudder et al. |
| 2010/0263354 A1 | 10/2010 | Sedlacek et al. |
| 2010/0263359 A1 | 10/2010 | Haverkamp et al. |
| 2011/0011060 A1 | 1/2011 | McCarthy |
| 2011/0061374 A1 | 3/2011 | Noritake |
| 2011/0079003 A1 | 4/2011 | Sun et al. |
| 2011/0094206 A1 | 4/2011 | Liu et al. |
| 2011/0142723 A1 | 6/2011 | Yamamoto |
| 2011/0192140 A1 | 8/2011 | Olivier et al. |
| 2011/0214416 A1 | 9/2011 | Kowada et al. |
| 2011/0283687 A1 | 11/2011 | Dobler et al. |
| 2011/0308234 A1 | 12/2011 | De Rudder et al. |
| 2012/0124983 A1 | 5/2012 | Hong |
| 2012/0324872 A1 | 12/2012 | Jaruvatee et al. |
| 2013/0064725 A1 | 3/2013 | Kageyama et al. |
| 2013/0097978 A1 | 4/2013 | Nagasaka et al. |
| 2013/0098007 A1 | 4/2013 | Waggoner et al. |
| 2013/0164181 A1* | 6/2013 | Iijima et al. .......... 422/169 |
| 2013/0164182 A1* | 6/2013 | Iijima et al. .......... 422/169 |
| 2013/0164183 A1* | 6/2013 | Iijima et al. .......... 422/170 |
| 2013/0219871 A1 | 8/2013 | Crandell et al. |

FOREIGN PATENT DOCUMENTS

| | | |
|---|---|---|
| DE | 102007034316 A1 * | 1/2009 |
| DE | 102008055190 A1 | 7/2009 |
| DE | 10 2008 043 408 A1 | 5/2010 |
| DE | 10 2012 010 878 A1 * | 12/2013 |
| EP | 2184455 A1 | 5/2010 |
| EP | 2 314 837 A1 | 4/2011 |
| EP | 2578828 A1 | 4/2013 |
| FR | 2965011 A1 * | 3/2012 |
| JP | 57-11261 U | 1/1982 |
| JP | 2004-270609 A | 9/2004 |
| JP | 2007-10099 A | 1/2007 |
| JP | 2008-014213 A | 1/2008 |
| JP | 2008-509328 A | 3/2008 |
| JP | 2008-151088 A | 7/2008 |
| JP | 2008-531921 A | 8/2008 |
| JP | 2008-208726 A | 9/2008 |
| JP | 2008-215286 A | 9/2008 |
| JP | 2008-274878 A | 11/2008 |
| JP | 2009-019610 A | 1/2009 |
| JP | 2009-030560 A | 2/2009 |
| JP | 2009-62816 A | 3/2009 |
| JP | 2009-68415 A | 4/2009 |
| JP | 2009-138627 A | 6/2009 |
| JP | 2009-156072 A | 7/2009 |
| JP | 2009-156076 A | 7/2009 |
| JP | 2009-156077 A | 7/2009 |
| JP | 2009-156078 A | 7/2009 |
| JP | 2009-167806 A | 7/2009 |
| JP | 2009-174485 A | 8/2009 |
| JP | 2010-101236 A | 5/2010 |
| JP | 2010-180863 A | 8/2010 |
| JP | 2011-032970 A | 2/2011 |
| JP | 2011-64069 A | 3/2011 |
| JP | 2011-099390 A | 5/2011 |
| JP | 2011-099416 A | 5/2011 |
| JP | 2011-202512 A | 10/2011 |
| JP | 2011-247128 A | 12/2011 |
| JP | 2012-026456 A | 2/2012 |
| WO | WO 2006/025110 A1 | 3/2006 |
| WO | WO 2006/093594 A1 | 9/2006 |
| WO | 2009024815 A2 | 2/2009 |
| WO | WO 2012/120000 A1 | 9/2012 |
| WO | WO 2013127955 A1 * | 9/2013 |

OTHER PUBLICATIONS

U.S. Appl. No. 13/696,293, filed Nov. 5, 2012, Title: "Reducing Agent Aqueous Solution Mixing Device and Exhaust Gas Post-Treatment Device", First Named Inventor: Tadashi Iijima.

U.S. Appl. No. 13/695,597, filed Oct. 31, 2012, Title: "Reducing Agent Aqueous Solution Mixing Device and Exhaust Gas Post-Treatment Device", First Named Inventor: Tadashi Iijima.

U.S. Appl. No. 14/000,481, Title: "Reductant Aqueous Solution Mixing Device and Exhaust Aftertreatment Device Provided With the Same", filed Aug. 20, 2013, First Named Inventor: Takashi Katou.

U.S. Appl. No. 14/000,521, Title: "Reductant Aqueous Solution Mixing Device and Exhaust Aftertreatment Device Provided With the Same", filed Aug. 20, 2013, First Named Inventor: Takashi Katou.

U.S. Appl. No. 14/000,580, Title: "Reductant Aqueous Solution Mixing Device and Exhaust Aftertreatment Device Provided With the Same", filed Aug. 20, 2013, First Named Inventor: Takashi Katou.

International Search Report (ISR) dated Apr. 23, 2013 issued in International Application No. PCT/JP2013/050763.

Design U.S. Appl. No. 29/466,879.

German Office Action dated Jun. 23, 2014 issued in counterpart German Application No. 11 2013 000 009.1.

* cited by examiner

REDUCTANT AQUEOUS SOLUTION MIXING DEVICE AND EXHAUST AFTERTREATMENT DEVICE PROVIDED WITH THE SAME

TECHNICAL FIELD

The invention relates to a reductant aqueous solution mixing device and an exhaust aftertreatment device provided with the reductant aqueous solution mixing device. Specifically, the invention relates to a reductant aqueous solution mixing device used for supplying a reductant aqueous solution such as urea aqueous solution to a selective catalytic reduction to purify exhaust gas and an exhaust aftertreatment device provided with the reductant aqueous solution mixing device.

BACKGROUND ART

An exhaust aftertreatment device that purifies nitrogen oxides (NOx) contained in exhaust gas of an engine with a selective catalytic reduction (abbreviated as "SCR" hereinafter) has been known. Urea aqueous solution injected by an injector is supplied to the SCR. The injector is attached as a component of a mixing device provided upstream of the SCR (see, for instance, Patent Literatures 1 and 2). The urea aqueous solution is injected from the injector to exhaust gas flowing through the mixing device to mix the urea aqueous solution with the exhaust gas within the mixing device. As a result, the urea aqueous solution is thermally decomposed by the heat of the exhaust gas to produce ammonia. The ammonia is used as a reductant in the SCR.

It should be noted in Patent Literatures 1 and 2 that the injector for injecting the urea aqueous solution is attached near an upstream end of the mixing device. Accordingly, a urea aqueous solution pipe connected to the injector extends from the injector along an extension of an axial line of a straight pipe as a part of the mixing device. In the above, when the exhaust aftertreatment device is to be disposed in a limited space (e.g. an engine room) as in a construction machine, the urea aqueous solution pipe extending from the injector interferes with a wall face of the engine room. Thus, in a typical arrangement, the urea aqueous solution pipe is jointed to the injector with the use of an elbow pipe at a position close to the injector, so that the urea aqueous solution pipe is bent approximately at a right angle to be housed within the engine room.

CITATION LIST

Patent Literatures

Patent Literature 1 U.S. Patent Publication No. 2011/0079003
Patent Literature 2 JP-A-2008-208726

SUMMARY OF THE INVENTION

Problems to be Solved by the Invention

However, even the elbow pipe of the urea aqueous solution pipe sometimes interferes with the wall face of the engine room depending on a size of the exhaust aftertreatment device and a size of the engine room. It is possible to set an attachment position of the injector in the mixing device at a position shifted toward a center along an axial line of the straight pipe of the mixing device to provide a sufficient gap between the injector and the wall face.

However, as in Patent Literatures 1 and 2, when an upstream side of the mixing device is bent to change a flow direction of the exhaust gas and the injector is attached to the direction-changing section, a mere offsetting of the attachment position of the injector results in reduction in a cross-sectional area of an exhaust-gas flow path at the direction-changing section, thereby failing to smoothly flow the exhaust gas. Especially, such a disadvantage is eminent in the arrangement disclosed in Patent Literature 1.

An object of the invention is to provide a reductant aqueous solution mixing device that is capable of avoiding an interference with other component(s) without inhibiting an exhaust gas flow, and an exhaust aftertreatment device provided with the reductant aqueous solution mixing device.

Means for Solving the Problems

A reductant aqueous solution mixing device according to a first aspect of the invention is interposed between a filter device that captures particulate matters in an exhaust gas and a selective catalytic reduction device disposed downstream of the filter device, the reductant aqueous solution mixing device adding a reductant aqueous solution in the exhaust gas, the reductant aqueous solution mixing device including: an elbow pipe attached to an outlet pipe of the filter device, the elbow pipe changing a flow direction of the exhaust gas flowing from the filter device; a straight pipe connected to a downstream side of the elbow pipe, the straight pipe extending in a direction intersecting an axial line of the outlet pipe of the filter device; and an injector attached to the elbow pipe, the injector injecting the reductant aqueous solution into an inside of the elbow pipe toward the straight pipe, in which the elbow pipe includes: an inlet connected to the outlet pipe of the filter device; an outlet connected to the straight pipe; a direction-changing section provided between the inlet and the outlet, the direction-changing section changing the flow direction of the exhaust gas introduced from the inlet toward the outlet; and an injector attachment on which the injector is attached, the injector attachment being provided outside the direction-changing section, the injector attachment being offset toward the outlet, and the direction-changing section includes a first bulging portion provided by outwardly bulging a part of the direction-changing section opposite to the injector attachment.

Herein, the term "downstream" refers to a downstream side in a flow direction of the exhaust gas. The same applies to the term "downstream" mentioned in the following description. Further, the term "upstream" refers to an upstream side in the flow direction of the exhaust gas. The term "outside the direction-changing section" refers to a side opposite to (in an axial-line direction of the straight pipe) a side at which the outlet of the elbow pipe is provided. The term "a part of the direction-changing section opposite to the injector attachment" refers to a part of the direction-changing section opposite to the injector attachment across the direction-changing section of the elbow pipe.

In the reductant aqueous solution mixing device according to a second aspect of the invention, the first bulging portion is provided between an outlet end of the outlet pipe of the filter device and an inlet end of the straight pipe.

In the reductant aqueous solution mixing device according to a third aspect of the invention, a mixing pipe including an axial first end supported by an inner wall of the injector attachment and an axial second end opened toward the straight pipe is provided inside the elbow pipe, and a part of the first bulging portion facing a region of the mixing pipe from the first end to a central portion curves outward and a part facing a region of the mixing pipe from the central portion to the second end extends inward.

In the reductant aqueous solution mixing device according to a fourth aspect of the invention, a mixing pipe comprising an axial first end supported by an inner wall of the injector attachment and a second end opened toward the straight pipe is provided inside the elbow pipe, and the first bulging portion has an inlet-side slant portion located near the inlet of the elbow pipe and facing a region from the first end to a central portion of the mixing pipe and an outlet-side slant portion located near the outlet of the elbow pipe and facing a region from the central portion to the second end of the mixing pipe.

In the reductant aqueous solution mixing device according to a fifth aspect of the invention, the direction-changing section includes a second bulging portion provided by outwardly bulging a part of the direction-changing section opposite to the first bulging portion across an axial line of the straight pipe.

In the reductant aqueous solution mixing device according to a fifth aspect of the invention, the direction-changing section includes a pair of side portions each provided in a form of a flat face between the first bulging portion and the second bulging portion.

In the reductant aqueous solution mixing device according to a fifth aspect of the invention, a flow path cross section of each of the inlet and the outlet of the elbow pipe is circular, and the flow path cross section of the direction-changing section of the elbow pipe perpendicular to the axial line of the straight pipe is linear at the first bulging portion, semi-circular at the second bulging portion and linear at the pair of side portions.

In the reductant aqueous solution mixing device according to a fifth aspect of the invention, the injector attachment is offset to be located near the outlet relative to the axial line of the outlet pipe of the filter device.

An exhaust aftertreatment device according to a ninth aspect of the invention includes: a filter device that captures particulate matters in an exhaust gas; a reductant aqueous solution mixing device according to any one of the first to seventh aspects of the invention, the reductant aqueous solution mixing device being disposed downstream of the filter device in parallel to the filter device; and a selective catalytic reduction device disposed downstream of the reductant aqueous solution mixing device, the selective catalytic reduction device reducing and purifying a nitrogen oxide in the exhaust gas.

Herein, the term "disposed . . . in parallel to" refers to a disposition in which the flow directions of the exhaust gas in each of the devices becomes parallel. The same applies to the term "juxtaposed" mentioned in the following description.

In the exhaust aftertreatment device according to a tenth aspect of the invention, the selective catalytic reduction device is juxtaposed with the reductant aqueous solution mixing device.

According to the first and ninth aspects of the invention, since the first bulging portion is provided to the elbow pipe, even when the injector attachment is offset toward the outlet of the elbow pipe, the flow path cross sectional area in the elbow pipe is not significantly narrowed and the exhaust gas flow is not inhibited. Further, the offset arrangement of the injector attachment keeps the injector and an elbow pipe for a reductant connected to the injector from protruding outward, thereby easily avoiding an interference with the other components. Further, since the first bulging portion bulges in a direction opposite to the injector attachment, it is less likely that the first bulging portion interferes with the other components.

According to the second aspect of the invention, since the first bulging portion is provided only at a part in which the flow path cross section is necessary to be enlarged, the other parts are not unnecessarily enlarged, whereby the interference with the other components can be further reliably avoided.

According to the third and fourth aspects of the invention, since the first bulging portion includes the inlet-side slant portion that curves outward corresponding to an area from the first end to the central portion of the mixing pipe and the outlet-side slant portion that extends inward corresponding to an area from the central portion to the second end of the mixing pipe, the flow path cross section of a portion of the elbow pipe corresponding to the mixing pipe can be reliably enlarged, so that, even with the presence of the mixing pipe, the flow path resistance can be sufficiently reduced and the exhaust gas flowing through the portion can be easily introduced to the inside of the mixing pipe.

According to the fifth aspect of the invention, since the second bulging portion is provided opposite to the first bulging portion across the axial line of the straight pipe, the exhaust gas is easily allowed to flow around toward the second bulging portion and a swirl is easily generated by the exhaust gas entering the mixing pipe from the second bulging portion, so that the reductant aqueous solution injected from the injector can be further reliably mixed in the mixing pipe.

According to the sixth aspect of the invention, since the first bulging portion and the second bulging portion are continuous with each other through the flat side portions and the side portions do not greatly bulge outward. Accordingly, an interference with the other component(s) in the vicinity of the side portions can be avoided, thereby allowing the filter device and the selective catalytic reduction device to be disposed in a more compact space.

According to the seventh aspect of the invention, the flow path cross section is in a form of the horseshoe shape. Accordingly, even when the mixing pipe is disposed, a sufficiently large flow path cross section can be ensured, so that the exhaust gas flow is not inhibited and an increase in a back pressure in the exhaust gas flow path can be securely restrained, thereby reducing fuel consumption of an engine and the like.

According to the eighth aspect of the invention, since the injector attachment is offset toward the outlet of the elbow pipe beyond the axial line of the outlet pipe of the filter device, an interference between the elbow pipe connected to the injector and the other component(s) can be avoided. Thus, the exhaust gas aftertreatment device including the filter device and the selective catalytic reduction device can be suitably disposed in a heavily limited disposition space such as an engine room.

According to the tenth aspect of the invention, since the filter device, the reductant aqueous solution mixing device and the selective catalytic reduction device are juxtaposed with each other, the flow direction of the exhaust gas in the respective devices can be aligned, so that the size of the entirety of the exhaust aftertreatment device can be further reduced.

DESCRIPTION OF EMBODIMENT(S)

Exemplary embodiment(s) of the invention will be described below with reference to the attached drawings.

Figure 1:
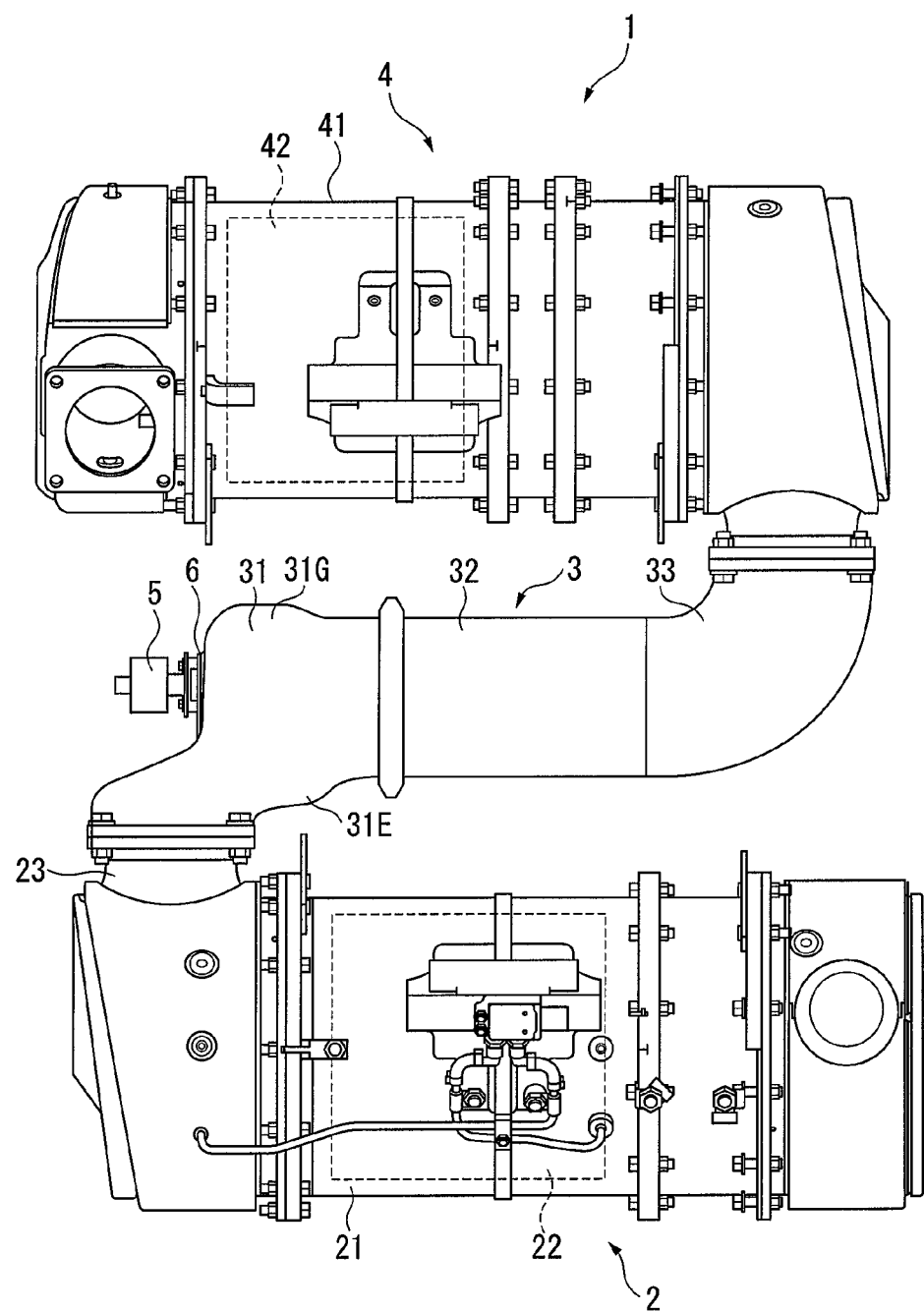
FIG. 1 is a plan view showing an exhaust aftertreatment device according to an exemplary embodiment of the invention.

As shown in FIG. 1, the exhaust aftertreatment device 1 includes a filter device in a form of a diesel particulate filter (abbreviated as "DPF" hereinafter) device 2, a reductant aqueous solution mixing device (referred to as a mixing device hereinafter) 3, and a selective catalytic reduction (abbreviated as "SCR" hereinafter) device 4. These devices 2 to 4 are provided in the exhaust pipe in which the exhaust gas from a diesel engine (not shown) flows. In a construction machine such as a hydraulic excavator, wheel loader and bulldozer, the exhaust aftertreatment device 1 is housed in an engine room together with the engine.

The DPF device 2 includes a cylindrical casing 21 and a cylindrical DPF 22 housed inside the casing 21. The DPF 22 captures the particulate matters in the exhaust gas passing through the DPF 22. An oxidation catalyst may be provided upstream of the DPF 22 in the casing 21. The oxidation catalyst oxidatively activates a post-injection fuel or a dosing fuel (both the same as diesel-engine fuel) supplied at an upstream side thereof to raise the temperature of the exhaust gas entering the DPF 22 to a temperature at which the DPF 22 is regenerable. The high-temperature exhaust gas causes a self-burning (burnout) of the particulate matters captured by the DPF 22 to regenerate the DPF 22.

The mixing device 3 adds a reductant aqueous solution in a form of urea aqueous solution in the exhaust gas. The mixing device 3 includes: an upstream elbow pipe 31 connected to an outlet pipe 23 of the DPF device 2 and serving as an elbow pipe for changing the flow direction of the exhaust gas flowing out of the DPF device 2 by approximately ninety degrees; a straight pipe 32 connected to a downstream end of the upstream elbow pipe 31 and extending in a direction intersecting an axial line CL2 (FIG. 2) of the outlet pipe 23 of the DPF device 2; a downstream elbow pipe 33 connected to a downstream end of the straight pipe 32 for further changing the flow direction of the exhaust gas from the straight pipe 32 by approximately ninety degrees; and an injector 5 attached to the upstream elbow pipe 31 and injecting the urea aqueous solution into the inside the upstream elbow pipe 31 toward the straight pipe 32. The SCR device 4 is connected to a downstream end of the downstream elbow pipe 33.

The SCR device 4 includes a cylindrical casing 41 and a cylindrical SCR 42 housed inside the casing 41. The SCR 42 reduces and purifies nitrogen oxides in the exhaust gas with ammonia (reductant) generated in the mixing device 3. An ammonia reduction catalyst may be provided downstream of the SCR 42 in the casing 41. The ammonia reduction catalyst oxidizes the ammonia unused in the SCR 42 to render the ammonia harmless, thereby further reducing emissions in the exhaust gas.

The urea aqueous solution injected from the injector 5 to the exhaust gas is thermally decomposed by the heat of the exhaust gas to become ammonia. The ammonia is supplied to the SCR device 4 as a reductant together with the exhaust gas.

The above-described DPF device 2, the mixing device 3 and the SCR device 4 are juxtaposed so that the flow directions of the exhaust gas flowing in the devices become substantially parallel. In this arrangement, the directions of the exhaust gas flowing inside the DPF device 2 and the SCR device 4 are opposite to the flow direction of the exhaust gas flowing inside the mixing device 3. Thus, these devices 2 to 4 are arranged substantially in an S-shape in a plan view. Accordingly, the size of the exhaust aftertreatment device 1 can be made compact as a whole, thereby allowing the exhaust aftertreatment device 1 to be securely disposed (e.g. mounted on an engine) in a limited housing space such as an engine room.

Figure 2:
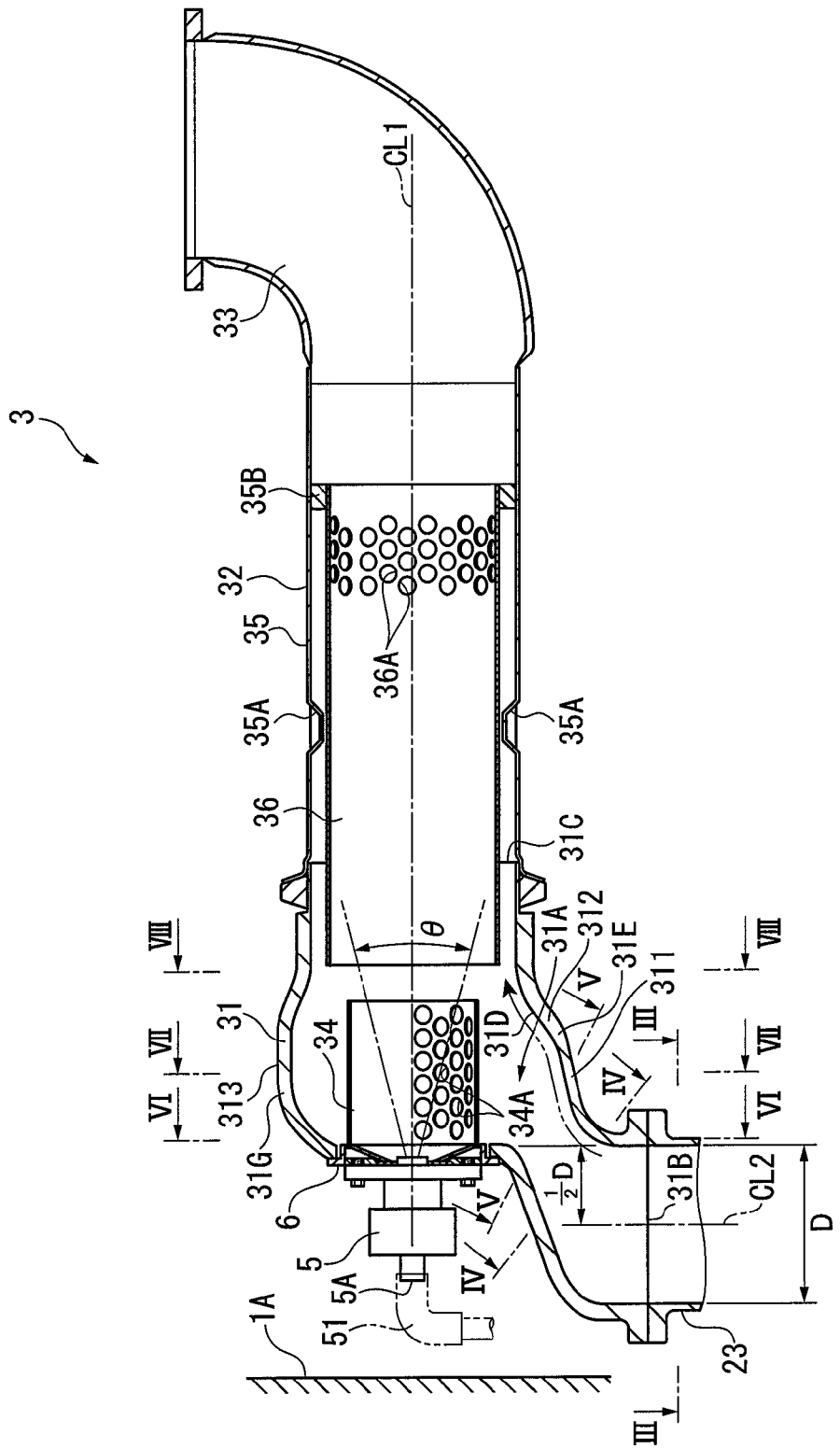
FIG. 2 is a cross section showing a mixing device of the exhaust aftertreatment device.

FIG. 2 is a cross section of the mixing device 3. The mixing device 3 will be specifically described below with reference to FIG. 2.

In the mixing device 3 shown in FIG. 2, a part of the upstream elbow pipe 31 for changing the flow direction of the exhaust gas is defined as a direction-changing section 31A. The upstream elbow pipe 31 includes a circular inlet 31B opened to and connected with the outlet pipe 23 of the DPF device 2; and a circular outlet 31C opened to and connected with the straight pipe 32. The direction-changing section 31A is defined between the circular inlet 31B and the outlet 31C.

An injector attachment 6 is provided to an outside of the direction-changing section 31A of the upstream elbow pipe 31. An injector 5 is attached to an outside of the injector attachment 6. A mixing pipe 34 is attached to an inside (i.e. interior side of the direction-changing section 31A) of the injector attachment 6. Axial first end of the mixing pipe 34 is supported by an inner wall of the injector attachment 6 while a second end of the mixing pipe 34 is opened to the straight pipe 32. The mixing pipe 34 is disposed in the upstream elbow pipe 31 to surround the urea aqueous solution injected from the injector 5. The mixing pipe 34 includes a plurality of circular holes 34A at a predetermined region thereof. The exhaust gas flowed through the circular holes 34A causes a swirl inside the mixing pipe 34, so that the urea aqueous solution injected from the injector 5 is more easily mixed with the exhaust gas.

The straight pipe 32 has a double-tube structure of an outer tube 35 and an inner tube 36 disposed inside the outer tube 35. Both of the outer tube 35 and the inner tube 36 are formed in a form of a cylinder. The inner tube 36 is welded or the like to a plurality of supporting recesses 35A provided to the outer tube 35 at an approximately axial middle thereof and is welded or the like to an inner wall of the outer tube 35 through an annular support member 35B at a downstream end thereof. Further, an upstream end of the inner tube 36 protrudes into the upstream elbow pipe 31. The upstream end of the inner tube 36 is defined so that the urea aqueous solution injected by the injector 5 at an injection angle θ (see chain lines in FIG. 2) of approximately 25 degrees securely enters an inside of the inner tube 36. A plurality of openings 36A are provided on an area near the downstream end of the inner tube 36.

The exhaust gas flows into a gap between the outer tube 35 and the inner tube 36. Since the supporting recesses 35A are discontinuously provided in the circumferential direction, the entered exhaust gas flows to the support member 35B through gaps between the supporting recesses 35A. The annular support member 35B blocks the flow of the exhaust gas, so that the exhaust gas flows into the inner tube 36 through the openings 36A to be joined with the exhaust gas flowing inside the inner tube 36 to be further flowed toward the downstream. In other words, the inner tube 36 is efficiently heated by the exhaust gas flowing inside and outside the inner tube 36. Thus, the urea aqueous solution injected to the inside of the inner tube 36 is securely thermally decomposed without being turned to droplets even when being adhered to an inner wall of the inner tube 36.

Further, as shown in FIG. 2, the injector 5 of this exemplary embodiment is provided on an extension of an axial line CL1 of the straight pipe 32. The injector attachment 6 on the upstream elbow pipe 31 for the injector 5 is offset so that a urea aqueous solution introduction port 5A of the injector 5 is located closer to the outlet 31C relative to a part of the inlet 31B most remote from the outlet 31C. In more detail, the injector attachment 6 is greatly offset toward the outlet 31C relative to the axial line CL2 of the outlet pipe 23 of the DPF device 2. Thus, in the exhaust aftertreatment device 1, an elbow pipe 51 of the urea aqueous solution pipe to be attached to the injector 5 does not excessively protrude outward, so that the elbow pipe 51 does not interfere with a wall face 1A of the engine room.

It should be noted that, when the mixing pipe 34 is connected to the injector attachment 6 in the upstream elbow pipe 31, the connected portion of the mixing pipe 34 is located closer to the straight pipe 32 relative to the axial line CL2 by approximately a half of an inner diameter D of the outlet pipe 23.

Further, in order to prevent the exhaust gas flow path in the upstream elbow pipe 31 from being narrowed due to the offset arrangement of the injector attachment 6, the upstream elbow pipe 31 of this exemplary embodiment has the following arrangement.

The direction-changing section 31A of the upstream elbow pipe 31 has a first bulging portion 31E that is provided by bulging a part of the direction-changing section 31A radially opposite to the injector attachment 6. The first bulging portion 31E is provided between an outlet end of the outlet pipe 23 of the DPF device 2 and an inlet end of the straight pipe 32. The first bulging portion 31E has a part facing a region from the first end of the mixing pipe 34 to an axially central portion of the mixing pipe 34 (i.e. an inlet-side slant portion 311 curved outward near the inlet of the upstream elbow pipe 31), and a part facing a region from the central portion to the second end of the mixing pipe 34 (i.e. an outlet-side slant portion 312 extending inward near the outlet of the upstream elbow pipe 31). A border region transiting from the inlet-side slant portion 311 to the outlet-side slant portion 312 bulges most outwardly.

In the first bulging portion 31E, an inclination of the inlet-side slant portion 311 relative to the axial line CL1 of the straight pipe 32 is gentler than an inclination of the outlet-side slant portion 312 relative to the axial line CL1. In other words, the inclination at the outlet-side slant portion 312 is steeper. Thus, though the first bulging portion 31A bulges from the upstream toward the downstream in a manner that the first bulging portion 31A gradually approaches the mixing pipe 34, the first bulging portion 31A approaches the mixing pipe 34 not evenly but gently at the inlet-side slant portion 311 at the upstream side (first step) and more steeply at the outlet-side slant portion 312 at the downstream side (second step). With such an arrangement, a sufficient flow path cross section can be ensured in a limited flow path length of the first bulging portion 31E while allowing a smooth flow of the exhaust gas toward the inlet end of the straight pipe 32.

The first bulging portion 31E ensures a sufficient cross sectional area of the flow path near the inlet 31B of the direction-changing section 31A so that the flow of the exhaust gas discharged from an engine is kept from being inhibited. Accordingly, an increase in the back pressure in the flow path of the exhaust path can be avoided, thereby improving fuel efficiency.

In addition, the direction-changing section 31A of this exemplary embodiment includes a second bulging portion 31G provided by bulging a part of the direction-changing section 31A opposite to the first bulging portion 31E across the axial line CL1 of the straight pipe 32. The second bulging portion 31G is also provided between the outlet end of the outlet pipe 23 of the DPF device 2 and the inlet end of the straight pipe 32. The second bulging portion 31G bulges outward in a region corresponding to a middle portion (i.e. except for both ends) of the mixing pipe 34 by the same distance from the axial line CL1 for a predetermined length along the axial line CL1. The bulging region defines a parallel portion 313 that is substantially parallel to the axial line CL1.

The presence of the second bulging portion 31G allows the exhaust gas to be likely to flow around toward the second bulging portion 31G, and the exhaust gas flowing from the second bulging portion 31G into the mixing pipe 34 is likely to cause a swirl, so that the urea aqueous solution injected by the injector 5 can be more reliably mixed with the exhaust gas within the mixing pipe 34.

Figure 3:
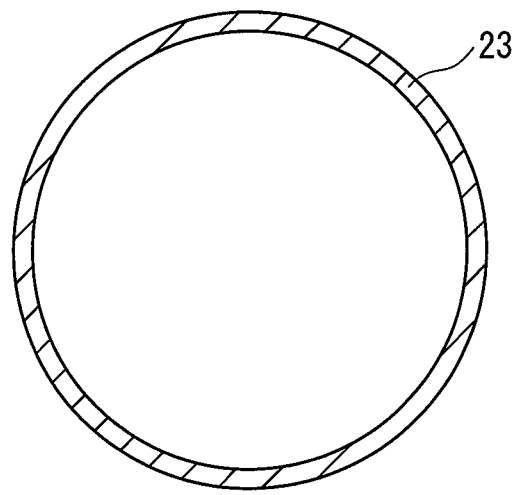
FIG. 3 is a cross section of an outlet pipe of a DPF device taken along line in FIG. 2.
Figure 4:
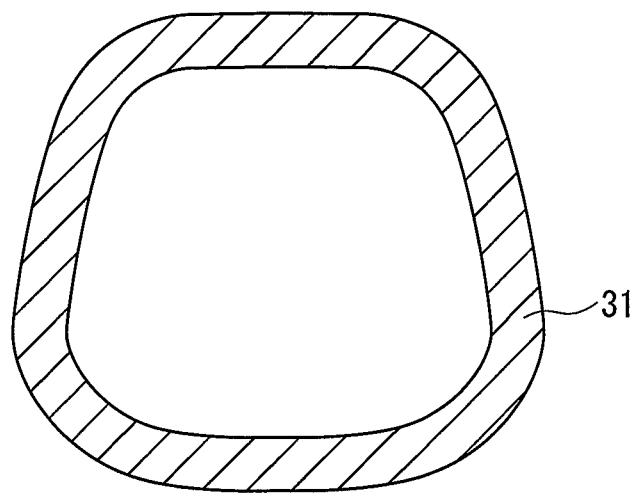
FIG. 4 is a cross section of an upstream elbow pipe taken along IV-IV line in FIG. 2.
Figure 5:
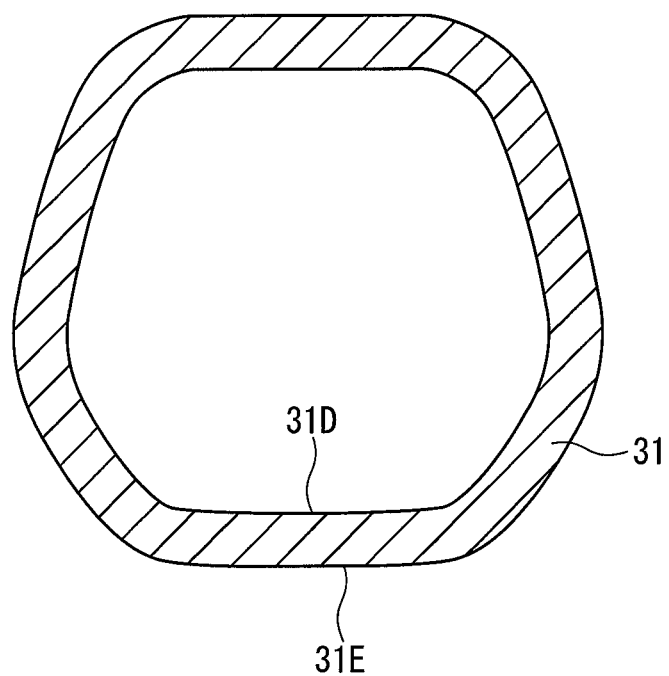
FIG. 5 is another cross section of the upstream elbow pipe taken along V-V line in FIG. 2.
Figure 6:
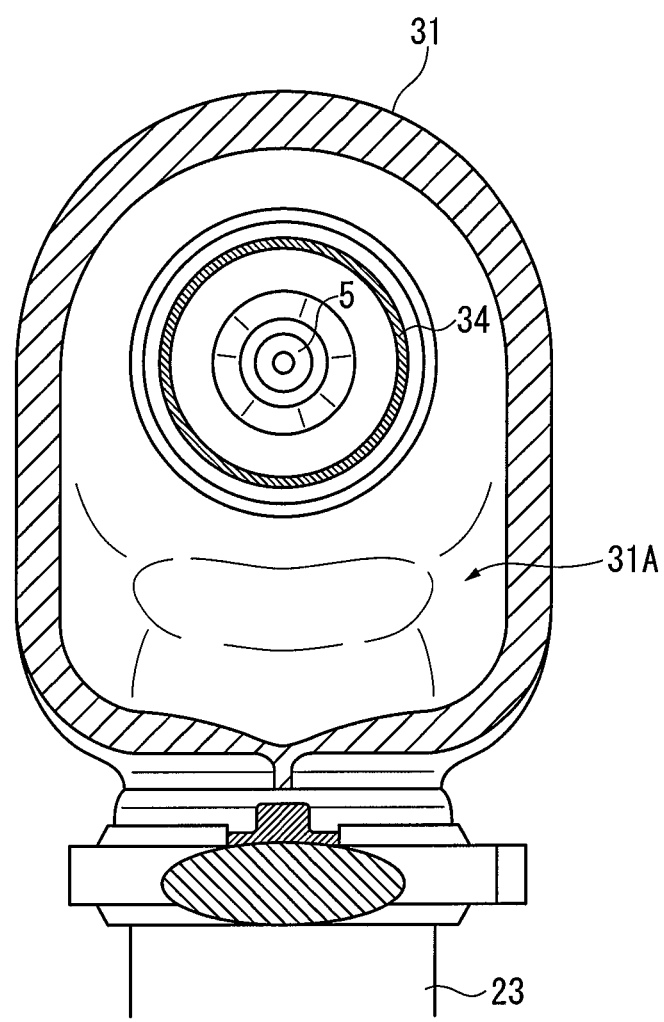
FIG. 6 is still another cross section of the upstream elbow pipe taken along VI-VI line in FIG. 2.
Figure 7:
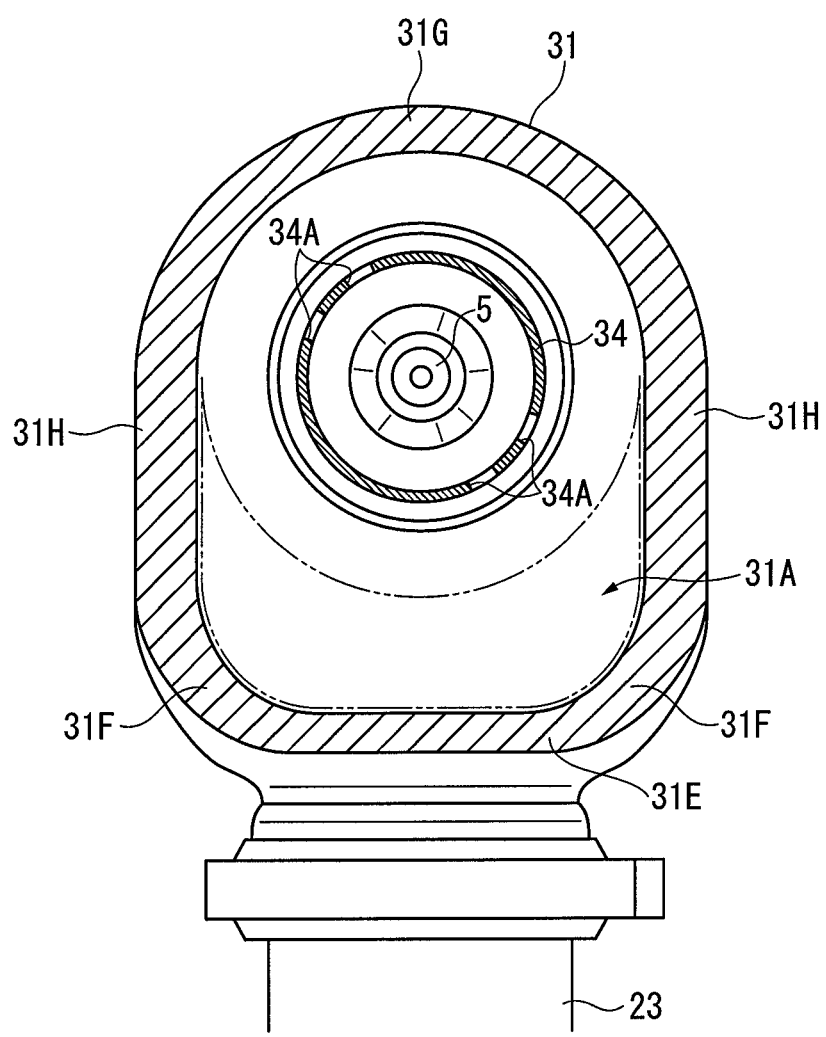
FIG. 7 is a further cross section of the upstream elbow pipe taken along VII-VII line in FIG. 2.
Figure 8:
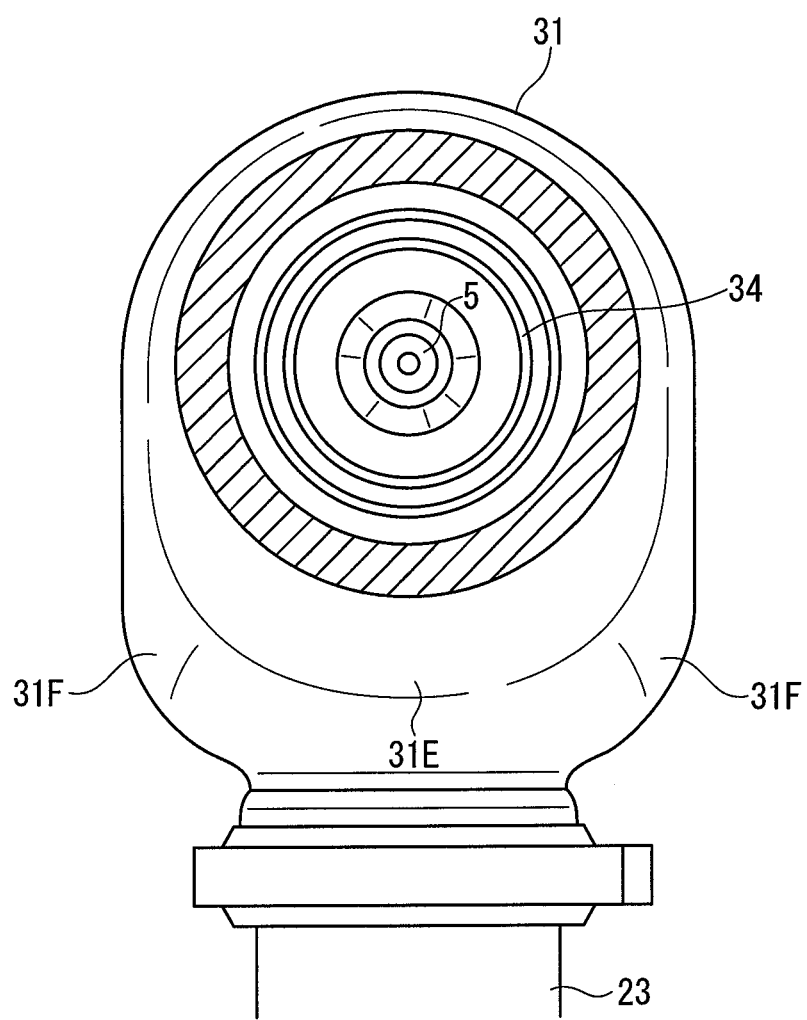
FIG. 8 is a still further cross section of the upstream elbow pipe taken along VIII-VIII line in FIG. 2.

FIGS. 3 to 8 respectively show cross sections of the outlet pipe 23 of the DPF device 2 and cross sections of the upstream elbow pipe 31. Specifically, FIG. 3 is a cross section taken along line, FIG. 4 is a cross section taken along IV-IV line, FIG. 5 is a cross section taken along V-V line, FIG. 6 is a cross section taken along VI-VI line, FIG. 7 is a cross section taken along VII-VII line, and FIG. 8 is a cross section taken along VIII-VIII line in FIG. 2.

As shown in FIG. 3, the flow path cross section of the outlet pipe 23 is circular. As shown in FIG. 4, one of the cross sections of the direction-changing section 31A of the upstream elbow pipe 31 (a flow path cross section taken along IV-IV line passing through the first inner constricted portion near the inlet 31B and an outer inclined surface portion) is substantially trapezoidal in which a side of the constricted portion is wider than a side of the inclined surface. As shown in FIG. 5, a flow path cross section taken along V-V line passing through an approximate center of the first bulging portion 31E and an outer constricted portion near the injector attachment 6 is approximately hexagonal in which a side of the first bulging portion 31E is wider than a side of the outer constricted portion.

In addition, the flow path cross section taken in a direction orthogonal to the axial line CL1 and along VI-VI line passing through a part of the upstream elbow pipe 31 near a connecting portion between the injector attachment 6 and the mixing pipe 34 is substantially in a horseshoe shape as shown in FIG. 6. In the horseshoe shape, a side of the upstream elbow pipe 31 near the inlet 31B is slightly dented. Further, the flow path cross section taken in a direction orthogonal to the axial line CL1 and along VII-VII line passing through the first and second bulging portions 31E and 31G and the center of the mixing pipe 34 is substantially completely in a horseshoe shape as shown in FIG. 7.

Specifically, the direction-changing section 31A includes a pair of flat side portions 31H defined between the first bulging portion 31E and the second bulging portion 31G. More specifically, the flow path cross section perpendicular to the axial line CL1 in the direction-changing section 31A is linear at the first bulging portion 31E, semi-circular in the second bulging portion 31G and linear in the respective side portions 31H.

In the flow path cross section of the horseshoe shape, the portion encircled by the two-dot chain lines in FIG. 7 is the flow path enlarged by the presence of the first bulging portion 31E. Since the flow path cross section from the first bulging portion 31E to the second bulging portion 31G is provided in a horseshoe shape, the flow path cross section includes a pair of corner portions 31F bulging outward in a cross section. Thus, as compared with an instance in which the flow path cross section is provided in an elongated hole with semicircular corners (i.e. without the corner portions 31F), a larger flow path cross sectional area can be ensured. In a further downstream side, the flow path cross section taken along VIII-VIII line passing through a part of the upstream elbow pipe 31 at which the first bulging portion 31E is not present restores a circular shape as shown in FIG. 8. An inlet end of the inner tube 36 is located corresponding to the circular portion.

Since the injector attachment 6 is offset, the flow path cross section of the upstream elbow pipe 31 having the first bulging portion 31E continuously changes from the shape corresponding to the circular shape of the outlet pipe 23 to the trapezoid, the hexagon and the horseshoe shape and finally restores the circular shape corresponding to the straight pipe 32. Thus, the flow path cross section can be smoothly connected from the outlet pipe 23 to the straight pipe 32.

An exhaust gas flow inside the upstream elbow pipe 31 will be described below with reference to FIG. 2. The exhaust gas flowed out of the outlet pipe 23 of the DPF device 2 flows through the inlet 31B of the upstream elbow pipe 31 to be directed toward the direction-changing section 31A. When flowing along the inside of the direction-changing section 31A, the exhaust gas flows through the first bulging portion 31E along an inner wall thereof toward the inner tube 36.

On the other hand, most of the rest of the exhaust gas flows toward the mixing pipe 34. As described above, the exhaust gas flowed toward the mixing pipe 34 flows through the circular holes 34A to cause a swirl inside the mixing pipe 34 so as to be mixed with the urea aqueous solution injected from the injector 5. Subsequently, the flow direction of the exhaust gas is changed to be parallel to the direction of the axial line CL1 to be directed to the straight pipe 32.

According to the above exemplary embodiment, even when the injector attachment 6 is offset toward the straight pipe 32 in accordance with the presence of the first bulging portion 31E provided to the upstream elbow pipe 31, the area of the flow path cross section is not significantly narrowed and the exhaust gas flow is not inhibited. Further, since the injector attachment 6 is offset, the elbow pipe 51 forming the urea aqueous solution pipe can be kept from protruding outward.

Incidentally, it should be understood that the scope of the present invention is not limited to the above-described exemplary embodiments but includes modifications and improvements as long as the modifications and improvements are compatible with the invention.

For instance, though the location of the injector attachment 6 provided to the upstream elbow pipe 31 is greatly offset toward the straight pipe 32 beyond the axial line CL2 of the outlet pipe 23 in the above exemplary embodiment, the offset amount may be determined as desired considering an interference degree of the elbow pipe 51 of the urea aqueous solution pipe with the other components and is not limited to the amount described in the above exemplary embodiment.

Though the flow path cross section of a part of the upstream elbow pipe 31 passing approximately the center of the first bulging portion 31E has a horseshoe shape in the above exemplary embodiment, the flow path cross section of the part may be an elongated hole or a trapezoid and can be determined as desired.

Though urea aqueous solution is used as the reductant aqueous solution, the other fluid may be used as the reductant aqueous solution in a modification of the invention.

The invention claimed is:

1. A reductant aqueous solution mixing device interposed between a filter device that captures particulate matters in an exhaust gas and a selective catalytic reduction device disposed downstream of the filter device, the reductant aqueous solution mixing device adding a reductant aqueous solution in the exhaust gas, and the reductant aqueous solution mixing device comprising:
   an elbow pipe attached to an outlet pipe of the filter device, the elbow pipe changing a flow direction of the exhaust gas flowing from the filter device;
   a straight pipe connected to a downstream side of the elbow pipe, the straight pipe extending in a direction intersecting an axial line of the outlet pipe of the filter device; and
   an injector attached to the elbow pipe, the injector injecting the reductant aqueous solution into an inside of the elbow pipe toward the straight pipe, wherein:
   the elbow pipe comprises
      an inlet connected to the outlet pipe of the filter device;
      an outlet connected to the straight pipe;
      a direction-changing section provided between the inlet and the outlet, the direction-changing section changing the flow direction of the exhaust gas introduced from the inlet toward the outlet; and
      an injector attachment on which the injector is attached, the injector attachment being provided outside the direction-changing section, and the injector attachment being offset so that a reductant aqueous solution introduction port of the injector is located closer to the outlet relative to a part of the inlet most remote from the outlet,
   the direction-changing section comprises a first bulging portion provided by outwardly bulging a part of the direction-changing section opposite to the injector attachment,
   the first bulging portion is provided between an outlet end of the outlet pipe of the filter device and an inlet end of the straight pipe,
   a mixing pipe comprising an axial first end supported by an inner wall of the injector attachment and an axial second end opened toward the straight pipe is provided inside the elbow pipe, and
   a part of the first bulging portion facing a region of the mixing pipe from the first end to a central portion curves outward and a part facing a region of the mixing pipe from the central portion to the second end extends inward.

2. The reductant aqueous solution mixing device according to claim 1, wherein
   the part of the first bulging portion facing the region of the mixing pipe from the first end to the central portion is an inlet-side slant portion located near the inlet of the elbow pipe, and the part of the first bulging portion facing the region of the mixing pipe from the central portion to the second end is an outlet-side slant portion located near the outlet of the elbow pipe,
   the inlet-side slant portion and the outlet-side slant portion are inclined from upstream toward downstream in the flow direction of the exhaust gas in a manner such that the inlet-side slant portion and the outlet-side slant portion gradually approach the mixing pipe, and
   an inclination of the inlet-side slant portion is gentler than an inclination of the outlet-side slant portion.

3. The reductant aqueous solution mixing device according to claim 1, wherein the direction-changing section comprises a second bulging portion provided by outwardly bulging a part of the direction-changing section opposite to the first bulging portion across an axial line of the straight pipe.

4. The reductant aqueous solution mixing device according to claim 3, wherein the direction-changing section comprises a pair of side portions each provided in a form of a flat face between the first bulging portion and the second bulging portion.

5. The reductant aqueous solution mixing device according to claim 4, wherein:
   a flow path cross section of each of the inlet and the outlet of the elbow pipe is circular, and
   a flow path cross section of the direction-changing section of the elbow pipe perpendicular to the axial line of the straight pipe is linear at the first bulging portion, semi-circular at the second bulging portion and linear at the pair of side portions.

6. The reductant aqueous solution mixing device according to claim 1, wherein the injector attachment is offset to be located near the outlet relative to the axial line of the outlet pipe of the filter device.

7. An exhaust aftertreatment device, comprising:
   a filter device that captures particulate matters in an exhaust gas;
   a reductant aqueous solution mixing device according to claim 1, the reductant aqueous solution mixing device being disposed downstream of the filter device in parallel to the filter device; and
   a selective catalytic reduction device disposed downstream of the reductant aqueous solution mixing device, the selective catalytic reduction device reducing and purifying a nitrogen oxide in the exhaust gas.

8. The exhaust aftertreatment device according to claim 7, wherein the selective catalytic reduction device is juxtaposed with the reductant aqueous solution mixing device.

* * * * *